(12) United States Patent
Vaquero Gonzalez et al.

(10) Patent No.: US 10,701,152 B2
(45) Date of Patent: Jun. 30, 2020

(54) MEMORY SYSTEM MANAGEMENT

(71) Applicant: Hewlett Packard Enterprise Development LP, Houston, TX (US)

(72) Inventors: Luis Miguel Vaquero Gonzalez, Bristol (GB); Suksant Sae Lor, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 300 days.

(21) Appl. No.: 15/573,863

(22) PCT Filed: Sep. 24, 2015

(86) PCT No.: PCT/EP2015/072044
§ 371 (c)(1),
(2) Date: Nov. 14, 2017

(87) PCT Pub. No.: WO2017/050385
PCT Pub. Date: Mar. 30, 2017

(65) Prior Publication Data
US 2018/0262568 A1    Sep. 13, 2018

(51) Int. Cl.
*G06F 15/16* (2006.01)
*H04L 29/08* (2006.01)
(Continued)

(52) U.S. Cl.
CPC ...... *H04L 67/1097* (2013.01); *H04L 41/0893* (2013.01); *H04L 43/08* (2013.01);
(Continued)

(58) Field of Classification Search
CPC ..... H04L 41/0893; H04L 43/08; H04L 45/22; H04L 45/64; H04L 49/3009; H04L 49/356; H04L 67/1097
See application file for complete search history.

(56) References Cited

U.S. PATENT DOCUMENTS 7,187,679 B2    3/2007 Dally et al.
7,277,429 B2    10/2007 Norman et al.
(Continued)

FOREIGN PATENT DOCUMENTS

CN    1889517 A    1/2007
CN    101252533 A   8/2008
WO    WO-2014178854  11/2014

OTHER PUBLICATIONS

Bovopoulos, A.D., et al., "Shared-memory Fabrics Meet 10-gbit Backplane Demands" Apr. 23, 2003, 11 pages.
(Continued)

*Primary Examiner* — Normin Abedin
(74) *Attorney, Agent, or Firm* — Hewlett Packard Enterprise Patent Department

(57) ABSTRACT

A memory system that is an example of the present disclosure comprises a memory fabric and an overlay. The memory fabric comprises: a network of memory components interconnected by optical interconnects, and memory address spaces of the memory components are aggregated and exposed as if the network were a single memory resource. The memory fabric further comprises router modules to implement steps of a fabric routing protocol to route memory-addressing requests along paths to destination memory components in the memory fabric. The overlay increases resiliency of the memory system and comprises overlay nodes to receive and forward memory-addressing requests from client programs and to implement steps of an overlay routing protocol to selectively control routing of received memory-addressing requests, to destination memory components, either along paths determined according to the fabric routing protocol or along alternative paths via overlay nodes.

15 Claims, 7 Drawing Sheets

(51) Int. Cl.
    *H04L 12/931*     (2013.01)
    *H04L 12/24*      (2006.01)
    *H04L 12/26*      (2006.01)
    *H04L 12/707*     (2013.01)
    *H04L 12/715*     (2013.01)
    *H04L 12/935*     (2013.01)

(52) U.S. Cl.
    CPC .............. *H04L 45/22* (2013.01); *H04L 45/64* (2013.01); *H04L 49/3009* (2013.01); *H04L 49/356* (2013.01)

(56) References Cited

U.S. PATENT DOCUMENTS

| | | |
|---|---|---|
| 7,330,908 B2 | 2/2008 | Jungck |
| 8,862,706 B2 | 10/2014 | Wittenschlaeger |
| 2001/0037409 A1 | 11/2001 | Ricciulli |
| 2003/0088696 A1 | 5/2003 | McCanne |
| 2004/0022194 A1 | 2/2004 | Ricciulli |
| 2009/0204718 A1* | 8/2009 | Lawton ................ G06F 9/5016 709/230 |
| 2014/0310467 A1 | 10/2014 | Shalf et al. |
| 2015/0200802 A1 | 7/2015 | Vinay et al. |
| 2016/0092362 A1* | 3/2016 | Barron ................ G06F 12/0835 710/308 |
| 2018/0121300 A1* | 5/2018 | Vaquero Gonzalez ...................... H04L 45/50 |

OTHER PUBLICATIONS

Novakovic, S., et al., Scale-out NUMA, Mar. 1-4, 2014, in Proceedings of ASPLOS-XIX, 15 pages.

\* cited by examiner

MEMORY SYSTEM MANAGEMENT

BACKGROUND

Some computing systems use memory systems comprising a plurality of interconnected memory components. The memory components may be distributed to different locations, with some memory components being located close to the computing systems and some other memory components being located at remote locations, or co-located in various numbers, as desired.

BRIEF DESCRIPTION OF THE DRAWINGS

The following detailed description refers to the accompanying drawings. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

DETAILED DESCRIPTION

Figure 1A:
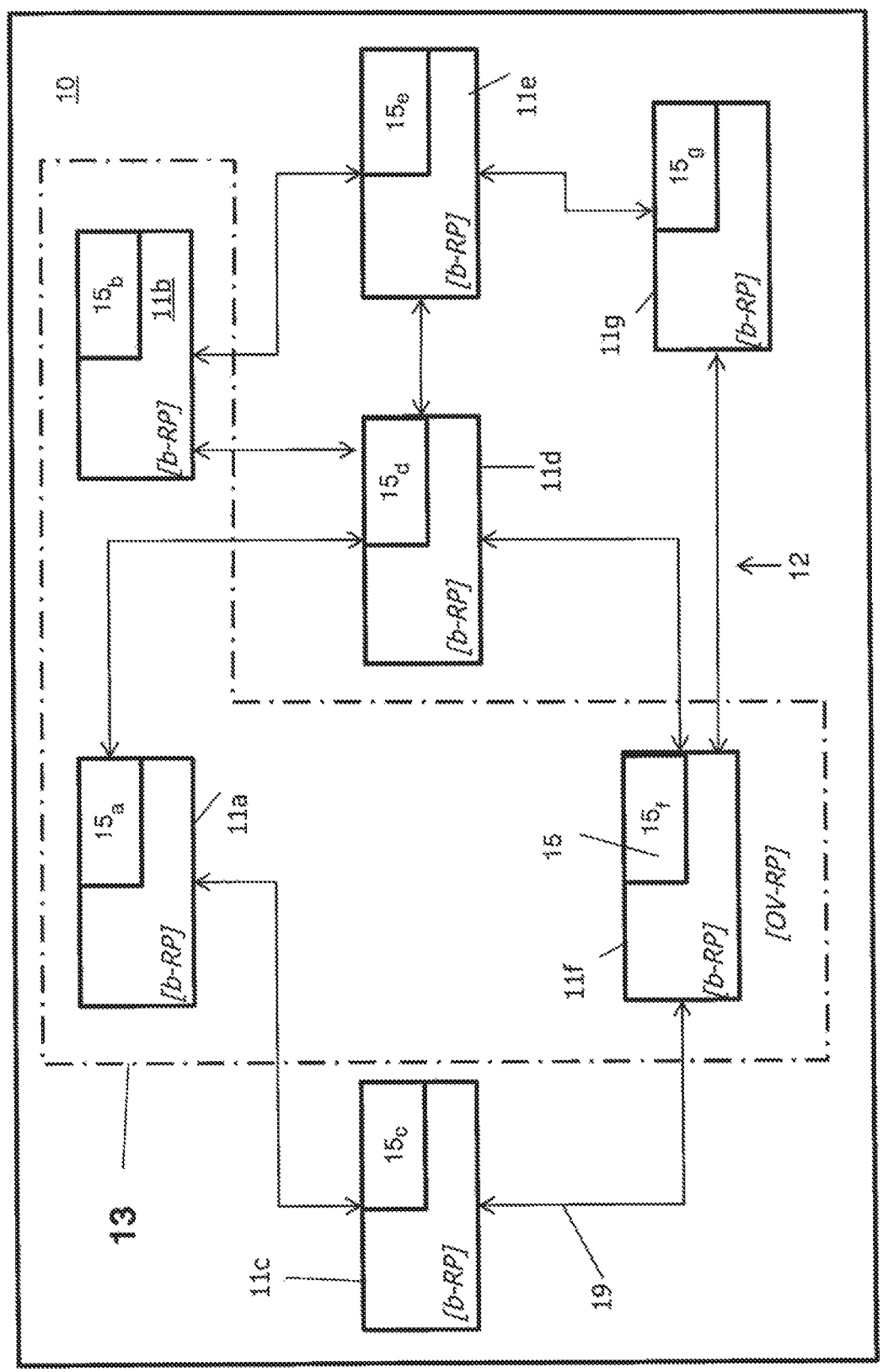
FIG. 1(a) schematically represents a memory system according to a particular example of the present disclosure.

Memory systems are being developed which comprise plurality of inter-connected memory components whose individual memory address spaces are aggregated and exposed (e.g. to processor/computing modules, and/or other memory components)—through entry points acting similarly to gateways in computer networks—as if the whole network of memory components were but a single memory component having a uniform memory space. Such memory systems are called "memory fabrics" in the present document.

In such memory fabrics, the use of optical interconnects to connect memory components to one another increases the speed of signal transmission between components and makes it feasible to manage a group of memory components as a single memory resource even in cases where the group comprises a high number of memory components distributed over a large physical space. Thus, for example, the memory fabric could extend over plural racks in a data centre, over plural data centers, etc.

These memory fabrics treat memory as if it were a routable resource (treating memory addresses somewhat in the way that IP networks handle IP addresses). The memory fabric handles memory traffic, that is, the items routed over the memory fabric and such items may comprise: memory access requests and other relevant messages/information to facilitate access, allocation, configuration and the like of the memory fabric, as well as data being read from/written to memory.

When read or write access is requested to a memory address in a memory fabric, a request to make a memory access (called here a "memory-addressing request") is transmitted along a path between router modules of different memory components, and the router module of the appropriate memory component (responsible for the memory address targeted in the request) takes care of accessing the correct memory address.

The router modules in the memory components of the memory fabric implement a routing protocol to determine the physical links that are used to route a memory-addressing request over the memory fabric to the request's destination; below such routing protocols are termed fabric routing protocols (f-rp). Router modifies in the memory fabric may perform steps of the fabric routing protocol to establish and use routing tables that specify which path to use to transmit a request from this router module towards a particular destination point in the fabric. The path may, for example, be specified in terms of an output port which the router module should use to forward the memory-addressing-request towards the router module of the appropriate destination memory component.

Physical link failures may occur in the event that a router module in the memory fabric fails or a physical link connecting two routers itself fails because of a software error, a hardware problem, or a link disconnection. Path failures occur for a variety of reasons, including bursts of traffic that cause a high degree of loss of memory-addressing requests or high, variable latencies. Software applications that access a memory fabric perceive failures as either outages or performance failures.

Certain memory fabrics may implement fabric routing protocols that are based on the assumption that there is only a single path to transmit a request from one particular point in the fabric to another. This may be a valid assumption in the case of a small, static and/or carefully designed fabric. In such a case the fabric routing protocol may cause the router modules to hold details of only one path to each potential destination. However, if a problem (outage, performance failure) arises somewhere along the single path designated in the routing table then it may become impossible to transmit a memory-addressing request to its intended destination. Memory fabrics of this type are not resilient the face of outages and performance failures.

Furthermore, certain memory fabrics may be large (i.e. they may involve a large number of memory components) and/or they may have a topology that does result from conscious design (for example because memory components can join/leave the fabric in an ad hoc manner). As a result there may be a plurality of route available for transmission of a request from one point to another, in particular as the size of the memory fabric increases.

In large memory fabrics, or those having ad hoc topologies, it could be possible, in theory, to implement a fabric routing protocol that allows router modules to hold routing tables that store details of multiple back-up paths to be used in the event that a problem affects the main path designated by the fabric routing protocol. However, in practice in real-world contexts, constraints may make it necessary to limit the number of alternative or back-up paths that are detailed in the routing tables, or to determine possible alternative routes only after a fault/failure condition has been detected. A real-world constraint in this regard may derive from the fact that discovery and monitoring of multiple alternative paths would consume excessive bandwidth.

Also, certain fabric routing protocols may include mechanisms which, in the event that an outage or failure condition affecting a path is discovered or suspected, tend to inhibit search for or adoption of an alternative path until the outage/failure has persisted for an extended time period. Mechanisms of this type may be implemented in view of enhancing the stability of the routing within the memory fabric, especially in the case of a large fabric.

Memory fabrics implementing fabric routing protocols of the types described in the preceding two paragraphs likewise are not resilient in the face of outages and/or performance failures and, in the event that an outage or performance failure occurs, an extended time period may elapse before the router modules establish workable new paths for memory-addressing requests. In the context of a fabric, it may be desirable or necessary to avoid extended delays of this type in the handling of memory-addressing requests, especially if the memory fabric in question implements a "flat" (non-hierarchical) memory system that performs both caching and persistent retention of data (i.e. as opposed to conventional, "hierarchical" memory systems which use high-speed volatile memory in association with slower-speed persistent storage). In a large memory fabric implementing a non-hierarchical memory system it may not be possible to configure the fabric routing protocol to simultaneously satisfy a requirement for stability in the routing configuration as well as a requirement to avoid re-routing delays.

Memory systems according to examples of the present disclosure make use of memory fabrics which, in order to exploit alternate paths that may exist through the memory fabric without requiring an increase in the complexity of the routing tables of the underlying fabric routing protocol, are associated with routing overlays. The routing overlays implement steps of an overlay routing protocol that may force use of alternative routing compared to the path designated by the fabric routing protocol. It may be considered that memory systems according to examples of the present disclosure implement multiple layers of routing protocols and that the routing protocol of the overlay layer comprises a higher-level outing protocol that takes precedence over the fabric routing protocol.

A routing overlay comprises a "virtual" topology associated with a group of clients and comprises a group of overlay nodes. Certain memory components of the memory fabric are selected to be the overlay nodes. The selected memory components are configured as overlay nodes by associating to these memory components certain overlay modules that implement steps of an associated overlay routing protocol. According to various implementations, the overlay modules may be implemented in hardware and/or a combination of hardware and programming that configures hardware. The hardware of each overlay module, for example, may include one or both of a processor and a machine-readable storage medium, while the programming is instructions or code stored on the machine-readable storage medium and executable by the processor to perform the designated function.

As an example, the overlay nodes of a given overlay may comprise respective interfaces to receive memory-addressing requests from, and deliver memory-addressing requests to, a respective associated client program. The client program may also include instructions which, in combination with hardware of the memory component, instantiate, on the memory component, the overlay modules necessary to configure this memory component as an overlay node.

The group of clients associated with the overlay nodes of a given overlay may collaborate to provide a distributed service or application. When deciding how to forward memory-addressing requests in the group, the overlay serving this group of clients may use routing metrics and/or policies that are service-specific. The present disclosure is not particularly limited in regard to the nature of the application or service provided by each group of client programs: some non-limiting examples include a generic addressing-request forwarding service (that may improve the reliability of memory-fabric delivery), and a multi-party data visualisation application that incorporates application-specific metrics in its path selection. A given memory fabric may have more than one overlay implemented on it, each associated with a respective application or service, or each associated with respective types of applications/services.

The overlay nodes of an overlay exchange information about the quality of the paths between themselves. This information exchange may be performed via a standard fabric routing protocol (e.g. a link-state-like routing protocol) and may build forwarding tables based on a variety of path metrics, for example, including (but not limited to) latency, addressee loss rate, and available throughput on the virtual "inter-overlay-node" links. (The links between overlay nodes are described here as "virtual" because they correspond to paths that may each include multiple physical links of the memory fabric). Each overlay node may obtain the path metrics using a combination of active probing experiments and passive observations of on-going data transfers.

The number of memory components that constitute overlay nodes of a given overlay may be limited to only a small fraction of the total number of memory components in the memory fabric, in order to facilitate aggressive maintenance of inter-overlay-node paths, via probing, without excessive bandwidth overhead. The relationship between the number of overlay nodes and the total number of memory components in the associated memory fabric may be varied taking into account the transfer rate of the underlying memory fabric technology (protocol overhead): it may be permissible to reduce the number of overlay nodes in a case where the protocol overhead is lower. For example, in view of the high transfer rates and reduced protocol overhead obtainable in a memory fabric using high-speed interconnects (e.g. optical interconnects), the ratio between the number of overlay nodes and the total number of memory components in an example memory system according to the present disclosure may be lower than the ratio between the number of Internet routers and the number of devices connected to the Internet. The coverage of each overlay (i.e. the amount of the memory fabric topology over which it extends) may vary depending on the targeted efficiency.

Disruptions in end-to-end communications over the memory fabric can be prevented through the use of a routing overlay, because the overlay may exploit underlying memory fabric route redundancy to a greater extent and/or more rapidly than may be done by the underlying fabric routing protocol, so as to react responsively to outages and performance failures that affect the router modules and physical links of the memory fabric.

Designing the system as a client-associated routing overlay allows each overlay to be more closely related to the group of clients using it, and thus enables an integration of client-specific (or applicator/service-specific) path metrics and path-selection policies in the overlay routing protocol.

The relatively small size of an overlay with respect to the large size of the fabric (in terms of the numbers of memory components involved in each) allows the overlay to maintain information about multiple alternate paths and to select the path that best suits the client according to a client-specified routing metric. In some example memory systems according to the present disclosure, by default the overlay maintains information about some specific pre-selected metrics for each virtual link: (i) latency, (ii) addressing loss rate, and (iii) throughput. Clients can override these defaults with their own metrics, and an overlay router constructs an appropriate routing table to choose good paths (see below).

FIG. 1(a) schematically illustrates a simplified example memory system 10 according to the present disclosure. The example memory system 10 of FIG. 1 includes a memory fabric 12a comprising a plurality of memory components 11a-11g), and a routing overlay 13. The memory components 11 of the memory fabric 12 implement steps of a fabric routing protocol (b-RP). Elements of the overlay implement steps of an overlay routing protocol (OV-RP).

Figure 1B:
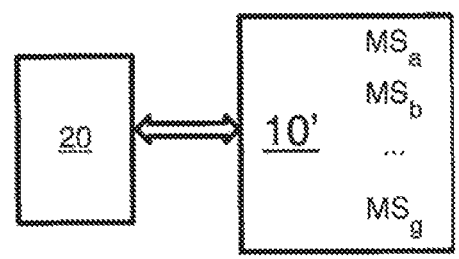
FIG. 1(b) illustrates how a memory fabric of the FIG. 1(a) memory system appears to a processor component or application seeking to read/write data in the memory system.
Figure 1C:
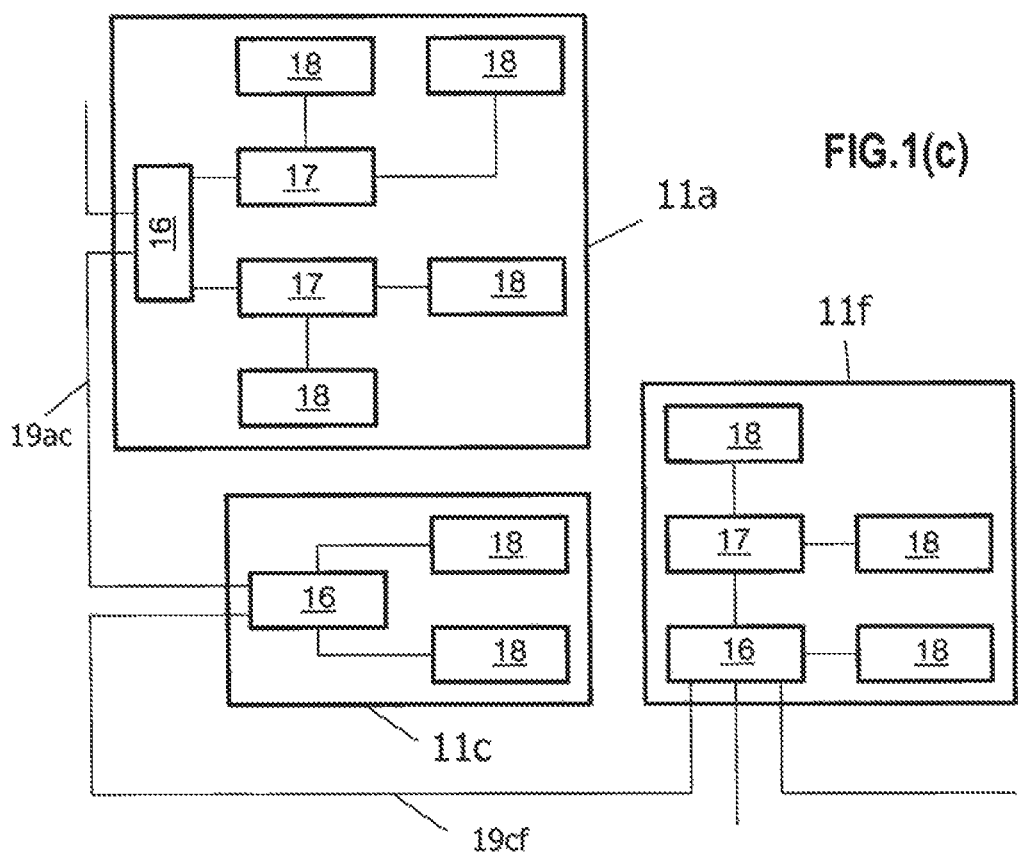
FIG. 1(c) illustrates an example implementation of a region of the memory fabric of FIG. 1(a)

FIG. 1(c) schematically illustrates a portion of the memory fabric 12 of FIG. 1(a), giving non-limiting examples of possible sets of modules that may be provided in memory components (here, the memory components 11a, 11c and 11f). Each memory component 11 comprises modules which may be a memory router module (RMM) 16, a memory switch (SMM) 17, or a plain memory module (PMM) 18 that provides persistent retention of data (for example non-volatile memory, battery-backed volatile memory).

Memory systems according to the present disclosure are not particularly limited with regard to the way in which the modules 16-18 are implemented. According to various implementations, the modules 16-18 may be implemented in hardware and/or a combination of hardware and programming that configures hardware. The hardware of each module, for example, may include one or both of a processor and a machine-readable storage medium, while the programming is instructions or code stored on the machine-readable storage medium and executable by the processor to perform the designated function. Furthermore, different technologies may be used (e.g. ASICs, memristors, system-on-chip SOC, and so on).

It should be understood that the modules of a same type within the same memory component can have heterogeneous characteristics, and the modules of a same type provided in different memory components of the same memory fabric can have heterogeneous characteristics. Thus, as an example, the plain memory modules may be built according to different technologies and may have different capacities for holding data. Furthermore, the memory components may comprise additional modules (e.g., processor modules), and indeed the memory fabric may be implemented as part of a mesh of interconnected processors and memory elements for example as illustrated in the applicant's co-pending patent application WO2014/178854.

The memory components 11 are coupled by physical links 19xy (where x and y indicate which of the memory components are coupled by the relevant physical link, omitting the common reference numeral 11).

Each memory component 11 may correspond to a single physical device or to a part of a physical device, or to plural physical devices. The memory fabric 12 may comprise devices of different types, made by different manufacturers, etc. Non-limiting examples of physical devices that may be used as memory components of the memory fabric 12 include servers in a data center, PCs, tablets, mobile phones, appliances having embedded processors, and so on.

Each memory component 11 has a memory space 15 where data may be written/read. This memory space 15 comprises memory spaces provided by modules in the relevant memory component. For example, according to the example illustrated in FIG. 1(c), the memory space of the memory component 11a may comprise all or part of the memory spaces of the illustrated four plain memory modules (PMM) 18 as well as all or part of any memory spaces provided by the illustrated two switch modules (SMM) 17 and memory router module (RMM) 16. A memory address space, MSa-MSg, is assigned to the memory space 15 of each memory component. The memory address space MSi assigned to the memory space 15 of a memory component 11i may comprise a range of contiguous addresses but this is not compulsory; the memory address space assigned to given memory component may comprise plural memory address ranges that are not contiguous.

Memory address spaces MS may be assigned to memory components in different ways. As one example, a centralized approach may be taken in which a memory broker module coordinates the assignment of memory addresses to different memory components in the memory fabric 12. As another example, a decentralized approach may be taken in which the memory components may have associated peers which communicate with one another to organize the assignment of memory addresses. As a yet further example, a hybrid approach may be taken combining elements of centralized and decentralized approaches, e.g. involving plural manager devices which communicate with one another.

Memory systems according to the present disclosure are not particularly limited in regard to the particular approach that is implemented to assign memory addresses to memory components. However, elements in the memory fabric implement a fabric-configuration protocol that aggregates the memory spaces of the different memory components in the memory fabric and exposes the aggregated memory spaces, to components which seek to read-write data in the memory fabric, as if the memory fabric were a single memory 15 whose memory space comprises the individual memory spaces of the memory components in the fabric. FIG. 1(b) schematically illustrates how the memory fabric appears to a processor or application 20 that wishes to read/write data.

Besides the fabric-configuration protocol, elements in example memory systems according to the present disclosure may implement other protocols (e.g. physical link auto configuration) which are not described here because they are not relevant for understanding the nature, function and use of the overlays described in the present disclosure. Suffice it to say that the same element(s) that manage memory-address assignment within the memory fabric may also manage how components (processing components, other memory components, etc.) which wish to access memory spaces in the memory fabric determine the appropriate memory address to be accessed; alternatively, different units may manage these two functions.

Each memory component 11 includes at least a memory router module (RMM) 16 so that memory-addressing requests to access memory addresses in the fabric 1 be routed to or via this memory component. To perform routing from one memory component to another, in order to send a memory-addressing request AR for example, the router memory modules 16 generally forward the request AR towards its destination along a pre-determined "best" path, which may be direct (along the physical link between the concerned memory components) or else indirect other memory components and links).

The memory router modules 16 implement steps of a first routing protocol, the fabric outing protocol, to implement the routing of the memory-addressing, requests AR. Example memory systems according to the present disclosure are not particularly limited with regard to the fabric routing protocol. As an example, a link-state type fabric outing protocol may be employed by which memory router modules establish and maintain routing tables designating the respective "best" paths to use for forwarding requests to particular destinations. The memory router modules 16 may determine the "best" paths based, at least in part, on characteristics of the physical links 19 between the memory components 11 (i.e. the "link state"), these characteristics being assessed by taking measurements and computing a metric based on the measurements.

The determination of the "best" path may depend, at least in part, on characteristics such as latency, bandwidth, reliability of transmission, etc. of the physical links. To evaluate the physical links, the router module 16 of each memory component may send a "PING" ("Packet InterNet Groper") along the links connected to it. When a ping reaches a destination, a response is sent back with an identifier of the destination, so that upon receipt of the response by the original router, the router may extract the identifier and calculate the latency to/from the destination. The measured latency (or a parameter value derived from it) may be treated as a "cost" associated with routing over a particular link, and low-cost paths may be preferred. Table 1 below gives an example of cost values Cxy that may be determined at a particular time for different physical links 19xy in the memory fabric of FIG. 1(a) according to an example fabric routing protocol.

TABLE 1

| Physical Link | Cost |
| --- | --- |
| PLac | 14 |
| PLad | 15 |
| PLbd | 7 |
| PLbe | 10 |
| PLcf | 11 |
| PLde | 5 |
| PLdf | 12 |
| PLeg | 8 |
| PLfg | 9 |

Instead of quantifying a "cost" associated with a physical ink it may be appropriate to assign a positive "value" the link, for example in the event that the assessed metric corresponds to some positive property of the link (e.g. available bandwidth, reliability of transmission) and high-value paths may be preferred.

A routing table MRTi may be associated with each router module 16i (either comprised within the router module 16 or within the memory component 11 and coupled to the router module 16, or common to several router modules) and comprises entries relating to the potential destinations and the associated paths.

In order to build the routing table, once the link characteristics are known, a router 16i may forward its destinations and costs to its neighbors, and receive updates from neighboring router modules advertising their destinations and associated costs, as determined from the ping procedure explained above. For example, the router module 16a of memory component 11a may advertise to the router module 16d of memory component lid that it may reach the router module 16c of memory component 11c with cost of 14, and is informed in turn by the router 16d of memory component 11d of its destinations and costs. The advertising protocol may require that a router module advertises only its information to its direct neighbors, or else broadcasts the information throughout the overlay and the fabric, with each router module sending collective information received from neighbors to other neighbors.

Furthermore, it may not be necessary for a router module to communicate by which links it may reach a given destination, only that it may reach the destination and the associated cost. For example, the router module 16a of memory component 11a may simply advertise that it can reach router 160c with a given cost, and does not necessarily specify whether it is via another router module or directly. In other samples, the router module 16 may communicate its route information as well.

As an example, a fabric routing protocol may be considered which specifies that addressing requests should be routed between memory components by using the "quickest route".

If all physical links 19xy have the same characteristics, then the quickest route between two router modules 16 is that with the fewest number of "hops" (components and links in the route). However, if the links have different characteristics, then these characteristics may be taken into consideration, depending on the implementation and configuration of the fabric.

A link from another router module 16 to a same destination may be such that the router determines, using a routing algorithm based on the previously-described "latency" metric, that the indirect path (comprising two or more physical links) is preferable to the direct path (comprising only one link). For example, to give an idea only, if the link 19be has a "cost" of 30 mS (milli-seconds), the link 19bd has a cost of 10 mS and the link 19de has a cost of 10 mS, the path 11b-11d-11e has a total cost of 20 mS whereas the path 11b-11e has a cost of 30 mS, which is higher. The route 11b-11d-11e may thus be designated in the routing table as the "best route" to use for routing a memory-addressing request from the router module 16b of memory component 11b to the router module 16e of memory component 11e. If the fabric routing protocol permits the route 11b-11e may be designated as a back-up route in the routing table.

The router modules 16 may repeat the steps of monitoring physical links and computing cost/quality parameters until no new updates occur. An update may occur for example if a metric changes due to a malfunction, a component going off-line, etc. To illustrate, with respect to the example given above, the cost of link 19be may change from 30 mS to 19 mS, such that the total cost (20 mS) of the indirect path 11b-11d-11e is now greater than the cost (19 mS) of the direct path 11b-11e. Whether or not to update the routing tables may depend on various factors, such as a pre-defined configurable update threshold, for example 5 mS, above which the routing table updates the "designated" path to the destination router 16e in memory component 11e so that it becomes 11b-11e, and below which the routing table preserve the previously-"designated" path 11b-11d-11e.

In general, a metric associated with a route is not updated based on a single measurement, but rather on moving averages that smooth peaks in requests from one component. A modification of the cost with respect to one element can affect memory addressing routing many "hops" away, and propagate throughout the fabric 12.

Table 2 below provides a simplified extract from a routing table MRTa that might be established by the router module 16a of memory component 11a, based on its own measurements and information received from router modules of other memory components in a case where the routing protocol designates the path having lowest "cost" as the designated path to be used for routing towards a destination memory component.

TABLE 2

| Destination | Designated Path (Links) |
|---|---|
| 11b | PLad + PLbd |
| 11c | PLac |
| 11d | PLad |
| 11e | PLad + PLde |
| 11f | PLac + PLcf |
| 11g | PLad + PLde + PLeg |

Once the fabric 12 has achieved full convergence, that is, attained a state in which all "best" paths between the memory components have been determined (according to the fabric routing protocol) and no further updates are received from neighboring router modules, or the number of changes is below a configurable threshold, then each router module 16 will have established a routing table that has one or more paths associated to the same destination. This redundancy may be used to calculate other alternative paths for that destination. Alternative paths may be stored locally as well as in well-known locations in the fabric 12, such as a central table connected to all the router modules 16, so that in the case of a failure of one of the router modules/switches its replacement can get the correct configuration from this known location. However, as explained above, the fabric routing protocol may be designed to limit the number of alternative paths whose details are determined in advance. Further, the fabric routing protocol may be designed so that when an outage or failure is first detected there is a delay before making a change to an alternative path, e.g. to give time for the outage/failure to right itself and avoid frequent path changes due to occurrence of transient conditions.

As illustrated in FIG. 1(a), in certain memory systems that are examples of the present disclosure an overlay 13 is associated with the memory fabric 12 and implements an overlay routing protocol OV-RP which may route memory-addressing requests preferentially over alternative paths compared to those designated by the underlying fabric routing protocol in the event that there is an advantage to be gained by using the alternative route. The alternative paths involve forwarding memory-addressing requests in an apparently indirect manner, via overlay nodes, instead of using the seemingly more direct path designated by the fabric routing protocol.

The topology of the overlay nodes in an overlay may be considered to be a "virtual topology" rather than a set physical topology, because new overlay nodes may be instantiated, and/or existing overlay nodes may cease to operate as overlay nodes as clients and their needs change. Moreover, the overlay nodes are actually interconnected by paths formed of physical links 19xy of the memory fabric. Further, the number of overlays may be as many as required by the clients.

Figure 2A:
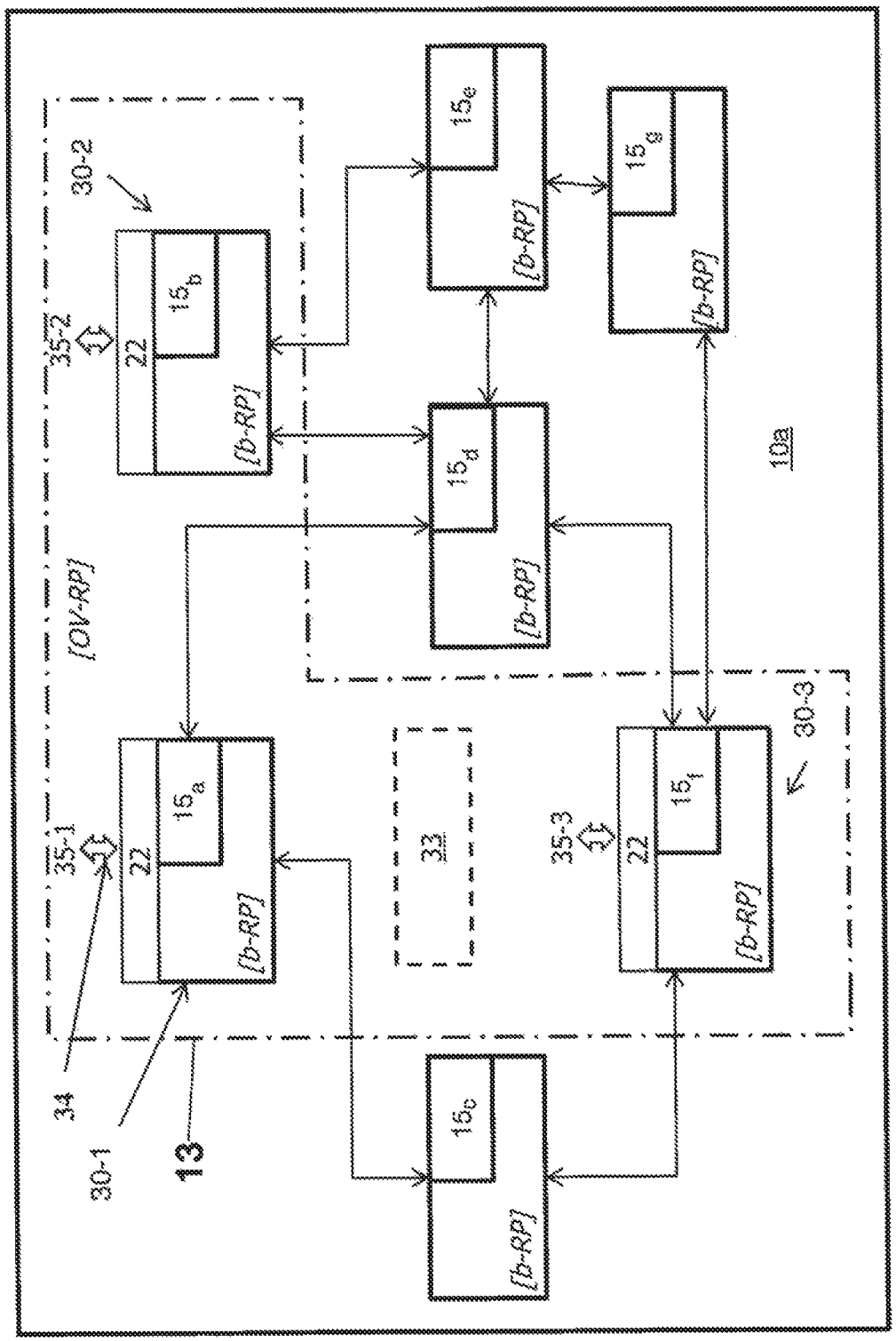
FIG. 2(a) schematically represents an example implementation of the memory system of FIG. 1(a), and FIG. 2(b) schematically represents a variant of the memory system of FIG. 2(a) adding a second overlay.

The example memory system 10 illustrated in FIG. 1(a) includes a single overlay 13 to implement an overlay routing protocol designated OV-RP. FIG. 2(a) schematically represents an example implementation 10a of the memory system of FIG. 1(a), in which the overlay 13 comprises overlay node modules 22 which are instantiated on certain memory components of the memory fabric (here memory components 11a, 11b and 11f) so that these memory components function as overlay nodes (designated as 30-1, 30-2 and 30-3 in FIG. 2(a)). The overlay 13 may include additional elements (designated 33) in FIG. 2(a)) which cooperate with the overlay nodes to implement the overlay routing protocol OV-RP. For example an additional element 33 could comprise an element holding an overlay routing table that is used in common by plural overlay entry nodes (see below). As another example, in certain memory systems certain overlay nodes may be instantiated on modules/components/devices that are not memory components that contribute to the addressable memory space of the memory fabric 12.

The overlay nodes are application layers, that is to say, virtual entities relating to one or more physical entities (the memory components 11), and provide entry and exit points to the fabric 12 for memory-addressing requests that are produced by clients associated with the overlay 13 and target memory addresses of the fabric 12 that correspond to memory components 11 that are also overlay nodes.

In the example illustrated in FIG. 2(a) each of the overlay nodes 30-1, 30-2 and 30-3 has a client-interface 34 via which an associated client program (35-1,35-2,35-3) interacts with the overlay. An overlay node 30 that receives a memory-addressing request AR from its associated client program 35 via its client-interface 34 may be termed an "entry node" (or, more specifically, an "overlay entry node"). An overlay node 30 that delivers a memory-addressing request AR to its associated client program 35 via its client-interface 34 may be termed an "exit node" (or, more specifically, an "overlay exit node"). A given overlay node 30 may be set up to function as both an entry overlay node and an exit overlay node (i.e. to be able to receive memory-addressing requests from, deliver memory-addressing requests to, an associated client program) but this is not mandatory: memory systems may be constructed which make use of certain overlay nodes that perform only one out of the entry and exit functions. Although not illustrated in the figures, the overlay 13 may include overlay nodes that are neither overlay entry nodes nor overlay exit nodes but which simply forward memory-addressing requests to other overlay nodes of the same overlay 13. Such overlay nodes need not have interfaces with client programs.

Figure 2B:
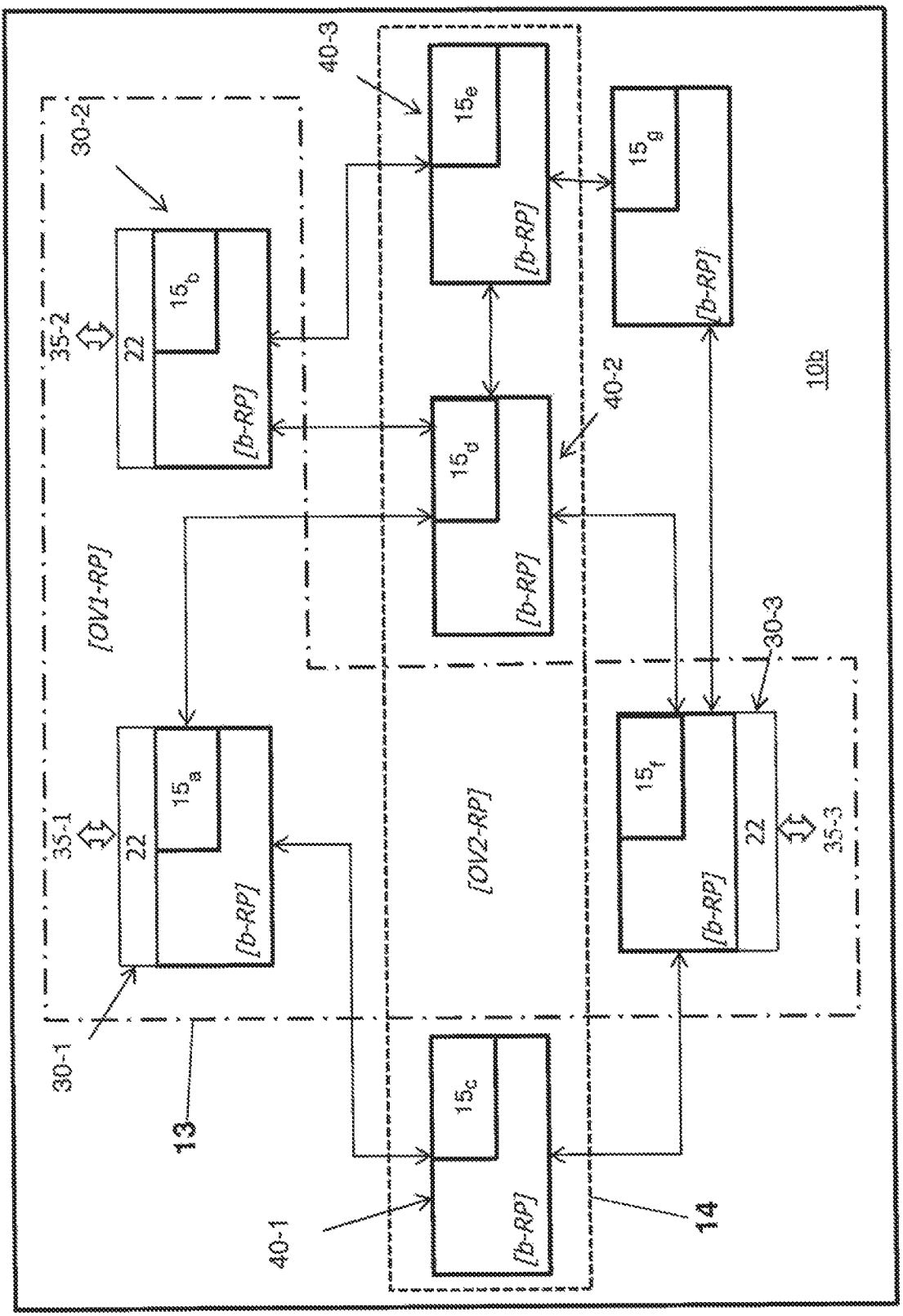

A same memory fabric 12 may have plural overlays associated with according to the needs of the client programs that communicate with memory components in the memory fabric (e.g. depending on the degree of resiliency that the client programs desire the memory fabric to exhibit). FIG. 2(b) illustrates a variant 10b of the memory system illustrated in FIG. 2(a). In the variant according to FIG. 2(b) there are two, overlays: the first overlay is designated 13 and includes overlay nodes 30-1, 30-2 and 30-3, and the second overlay is labelled 14 and includes overlay nodes 40-1, 40-2 and 40-3. For simplicity, the clients, overlay node modules and interfaces of the second overlay 14 are not illustrated in FIG. 2(b). It be understood that different overlays need not have the same numbers of overlay nodes.

It may be considered that the overlay nodes in a given overlay are connected between themselves by logical links LLxy. In general the number of these logical links LL will be very much less than the number of physical links 19 in the memory fabric (or, even, in the same region of the memory fabric in the case of an overlay that extends only over a particular zone or region of the memory fabric). Therefore it may be possible, without using excessive bandwidth, to perform discovery of the logical links, and monitoring of their properties/state even in a case where the logical links are monitored aggressively (intensively) by relatively frequent active probing. In example memory systems according to the present disclosure overlay nodes comprise overlay routers ORj which establish overlay node routing tables ORTj for use in controlling routing of memory-addressing requests to destination overlay nodes (exit overlay nodes) in the overlay.

In some example implementations, each overlay router has its own overlay routing table, but this is not mandatory; shared overlay routing tables may be used by plural overlay routers.

The overlay routers of the overlay nodes ONj monitor the quality of the logical links LLxy between themselves. Each overlay router may disseminate, to other overlay routers, topology information regarding the topology of the overlay node links LL between overlay nodes, as well as information on the virtual-link quality (e.g. metrics indicative of a cost or value associated with the virtual link) and this information may in turn be used to build overlay routing tables. This topology and virtual-link-quality information may be routed over the overlay forwarding mesh itself to ensure that overlay-routing information is propagated in the event path outages and failures (e.g. heavy loss periods) in the underlying memory fabric. The topology and virtual-link-quality information may be routed using a link-state routing protocol.

The overlay routers may use a set of algorithms with which to evaluate potential inter-overlay-node paths in order to provide a number quantifying how "good" a path is according to a policy or metric. The latter algorithms may evaluate the quality of the paths based on client- or application-defined policies that depend on specified parameters (i.e. "metrics", e.g. latency, throughput, etc. of the links LL). Path evaluation may depend on how the data for two or more links are combined to form a route and the formula used to evaluate the path.

The overlay routers may use an algorithm to determine if a link between overlay nodes is still alive. To determine if a link LL path between overlay nodes is still alive each overlay router may use an active probing mechanism, similar to a ping, e.g. at a low frequency, to determine whether the link LL between it and the overlay router of the relevant other overlay node is still working. However, any method of link status determination can be used. If the loss of a probe is detected, the overlay router may replace the normal probing sequence by a sequence of higher-frequency probes, that is to say, probes sent more frequently, sent in relatively quick succession spaced by a predefined time.

If after a predefined time there is no response, then the overlay router may consider that this link is dead (i.e. there is an outage). If however one probe receives a response, then the overlay router may cancel the higher-frequency probes and return to sending probes at the normal, lower, frequency. In one example, links experiencing outages are rated on their addressing-request loss rate history; and a link experiencing an outage will always be rated lower than a link that is not experiencing an outage. (Here the notion of "rating" relates to the way in which an overlay-routing policy may compare the desirability of using one link compared to using another.)

Each overlay node in an N-node overlay has N−1 virtual links. Each overlay node's router may periodically request summary information of the different performance metrics to the N−1 other nodes from its to local performance database and disseminate its view to the others.

According to the overlay routing protocol, the overlay routing tables are used determine a cost or value associated with use of an inter-overlay-node path, e.g. according to a policy which may be application-specific, and this cost/value compared against the cost/value of the designated path that is specified by the underlying fabric routing protocol for routing a given memory-addressing request to its intended destination. Based on the state of the memory fabric, the overlay decides whether to let memory-addressing requests travel directly to other memory components or if they should be transmitted indirectly, via other overlay nodes. The routing procedure will be described further below.

The client-interface 34 via which a client program 35 interacts with its associated overlay node 30 may be implemented in hardware and/or a combination of hardware and programming that configures hardware. The hardware of the client interface, for example, may include one or both of a processor and a machine-readable storage medium, while the programming is instructions or code stored on the machine-readable storage medium and executable by the processor to perform the designated function. The client-interface 34 may comprise an "Application Programming Interface" (acronym API) implementing a "conduit" CN, which the client uses to send and receive addressing requests AR. As is usual for an API, the application programming interface may specify commands, functions, syntax, libraries, and so on, to be used by the client program to interact with (and/or implement) the associated overlay node. The API functionality may be implemented by a processor running instructions that are included in the client program, external to the client program, a combination of the two, and so on.

The conduit CN may access the fabric 12 by means of the following two functions.

1. send(addressing request, destination, via overlay node)—function that directs the associated overlay node 30 to the overlay routing protocol to forward the memory-addressing request to a destination overlay node. As discussed below, AR is forwarded over the physical links of the memory fabric but the path which AR follows over the links may be the path designated by the fabric routing protocol or an alternative path (via a set of one or more overlay nodes); and 2. receive(addressing request, via overlay node) is a callback function that is called responsive to an addressing request AR for the client program arriving at its associated overlay node. This callback may be invoked after the conduit CNj matches the "type" of the addressing request AR (e.g. as specified in a header associated with the received addressing request) to a set of path types that may be preregistered by the client CLj, for example at a time when it joins the memory fabric. The path types may relate to a preferred type of path that should be used for conveying AR, e.g. a path having low-latency, high-throughput, etc.

A client program 35k that seeks to access a memory location in the memory fabric may determine (e.g. from a memory broker as mentioned above) a target memory address that designates the appropriate memory location. The client program is configured to use an associated overlay for making memory accesses to the memory fabric and so sends an address request AR to the overlay via a conduit CNk to its associated overlay node 30k. This first overlay node 30k that receives the request is the overlay entry node EN in this instance.

Figure 3:
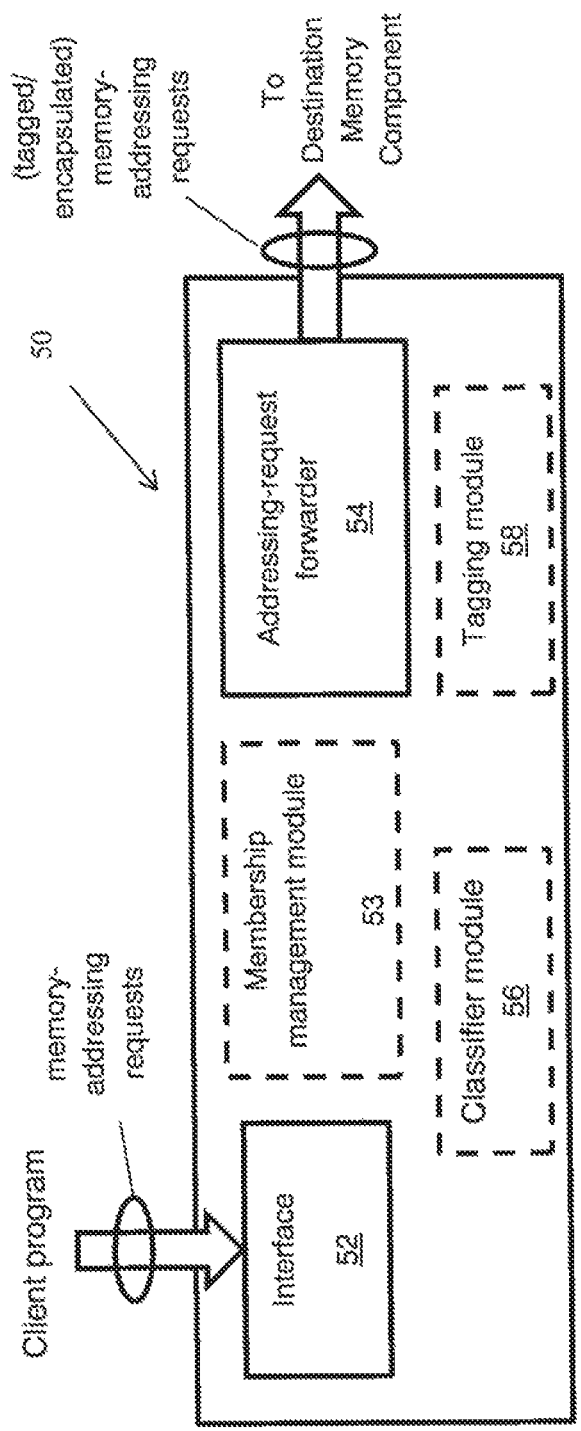
FIG. 3 is a schematic representation of an example memory component device that may be connected, to serve as an overlay entry node, in a memory system according to the present disclosure.

FIG. 3 illustrates schematically a memory component device 50 that may be connected, to serve as an overlay entry node, in a memory system according to the present disclosure. The memory component device 50 may be a memory component which has been configured (e.g. by programming) to operate as an overlay entry node.

The memory component 50 serving an overlay entry node has an interface 52 for receiving memory-addressing requests from an associated client program The memory component device 50 also includes an addressing-request forwarder 54 to control routing of the memory-addressing request according to the appropriate overlay muting protocol.

The addressing request forwarder 54 may access an overlay routing table to determine a value/cost associated with inter-overlay-node paths according to some set of one more criteria (e.g. based on a set of one or more metrics). Taking into account the costs/values indicated in the overlay routing table, the addressing request forwarder 54 may apply a policy to determine whether to route a given addressing request over the path designated in the underlying fabric routing protocol or whether to use an alternative path, via a set of one or more overlay nodes.

Each overlay entry node has an (integrated or external) membership manager module 53, accessible by the addressing request forwarder 54, which maintains a list of the "members" of this overlay (i.e. the overlay nodes in this overlay and/or the client programs in the group using this overlay). Overlay routers and membership managers may exchange addressing requests over the overlay forwarding mesh itself, rather than over direct in-memory paths whereby even if some underlying fabric paths fail these messages can still be forwarded.

The addressing request forwarder 54 may provide a timer registration and callback mechanism to perform periodic operations, and a similar service for fiber connectivity data availability. The timer registration and callback mechanism may handle any administration necessary in the memory system to enable the periodic function to be implemented at its appointed time.

The memory component 50 serving as an overlay entry node may include a classifier module 56 to assign a "type" to a received memory-addressing request, for example a "type" which makes it preferable to route this request over links having particular characteristics. Thus, for example, the "type" may indicate that this request needs to be routed over paths having particular properties (e.g. low congestion, high throughput, etc.) or the "type" may indicate some characteristics of the application or service making the request and decision elements in the overlay may infer from this "type" that it is preferable to route over links that have particular technical properties.

The memory component 50 may include a tagging module 58. The tagging nodule 58 may be designed (e.g. by virtue of programming, by virtue of features of its construction, etc.) to associate a set of one or more tags to a memory-addressing request in the event that the addressing-request forwarder 54 decides to route the memory-addressing request over an "alternative path" via a set of one or more overlay nodes. A tag may comprise one or more data items (e.g. codes identifiers, particular changes in the request, etc.) whose meaning is understood by the overlay nodes in this overlay. For example, the tagging module may encapsulate the memory-addressing request and apply to it identification tags which indicate that the request is to be routed over the alternative path. For instance, the identification tags may identify a first overlay node on the alternative path, as well as the ultimate destination (i.e. the exit overlay node for this request) as well as the first overlay node. In memory components which receive the tagged request, the router modules apply the fabric routing protocol to determine how to direct the request towards the first overlay node (i.e. over the "alternative path") rather than seeking to route the request directly to the ultimate destination.

In the event that the overlay node includes a classifier module 56, the tagging module 58 may be designed to associate a "type" tag to a memory-addressing request that the addressing-request forwarder 54 intends to route over an "alternative path" via a set of one or more overlay nodes. The "type" tag may be based on an explicit indication that is provided by the client which supplies the request, or may be generated by the entry overlay node.

The "type" tag may be used by downstream overlay nodes to help identify related (same type) memory-addressing requests. The overlay may be designed so that downstream overlay nodes keep memory-addressing requests that have the same type tag on the same path even if the link conditions change, provided that the relative benefit of using the selected path (as opposed to another) does not deteriorate beyond a specified threshold amount. In the event that type tags are applied at the overlay entry node it becomes possible for the application run by the associated client to exercise maximum control over what the memory fabric treats as a "flow" of related memory-addressing requests.

According to an ample implementation, the overlay entry node that receives a request from a client (via its conduit) may classify the memory-addressing request in a manner that indicates a type of path (e.g., low-latency, high throughput, etc.) that should be used preferentially for routing this request. The overlay entry node may determine a selected path, from its topology table and overlay routing table, to use for routing the request and, if this path is "better" (according to an applied policy) compared to the designated path specified by the underlying fabric routing protocol, the overlay entry node may encapsulate the addressing request into an overlay header, tag it with some identification information (e.g. tags) that simplifies forwarding by downstream overlay nodes, and forward it on. Each subsequent overlay node simply determines the next forwarding hop based on the destination address and the identification tag(s). The final overlay node that delivers the addressing request to the application is the overlay exit node in this case.

According to this example, at each overlay node downstream of the overlay entry node, an addressing-request forwarder determines the best path for the incoming encapsulated addressing request, and sends it to the next overlay node. Path selection is done at the overlay entry node, which may also tag the request, simplifying the forwarding at other overlay nodes. When the request reaches the overlay exit node, the forwarder there hands it to the appropriate output conduit, which passes the data to the client application.

According to this approach, the overlay entry node has more control over subsequent path selection than in traditional datagram networks. This node may tag the memory-addressing request header with a type tag (or "flow ID") that identifies the flow to which the addressing request belongs; subsequent overlay routers attempt to keep a flow ID on the same path it first used, barring significant link changes.

The overlay nodes may be designed (programmed, constructed) to perform steps of an overlay routing protocol which accommodates the following behavior: assignment of different priorities to different memory-addressing requests based on the nature of a transaction that the memory-addressing request forms part of. Thus, for example if a particular memory-addressing request is generated as part of the performance of a transaction that is rated as important (e.g. a financial transaction, a transaction performed during provision of emergency services, etc.) then the overlay routing protocol may assign a high priority to this request. The overlay routing protocol may cause the applicable routing policy applied by the overlay entry node to be adjusted according to the priority (low or high) of the memory-addressing request being routed. For example, the routing policy may be adjusted to change the weighting given to certain metrics (e.g. increasing the importance of high reliability, fast throughput, etc.).

Figure 4:
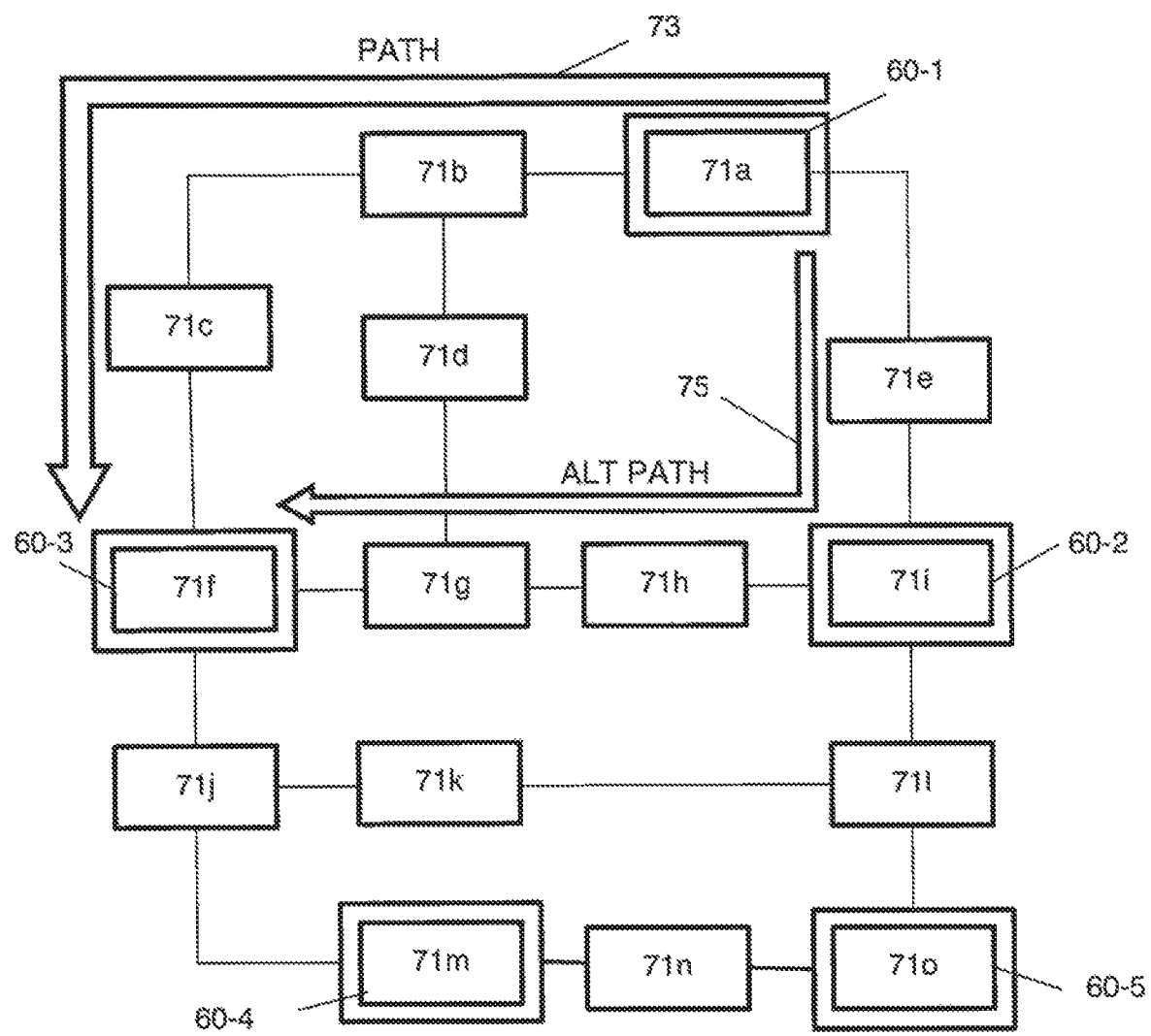
FIG. 4 is a diagram to illustrate an example of a routing path determined according to a fabric routing protocol and an alternative path determined according to an overlay routing protocol (transiting via an intermediate overlay node)

FIG. 4 illustrates an example of a routing path determined according to a fabric routing protocol and an alternative path which transits via an intermediate overlay node (and may be specified according to an overlay routing protocol, depending on the requesting client's needs). The example illustrated in FIG. 4 shows fifteen memory components 71a to 71o, five of which are configured as overlay nodes 60-1 to 60-5 (and respective clients 65-1 to 65-5 are associated with the overlay nodes 60-1 to 60-5). Physical links 69xy interconnect the memory components 71.

With respect to FIG. 4, consider a case where a client 65-1 associated with the overlay node 60-1 specifies a policy which requires that memory-addressing requests be sent along the least congested path possible, that is to say, with the least amount of traffic on the link (a maximum congestion may be set for a link). The client program 65-1 may notify the associated overlay entry node 60-1 of this policy via functionality provided in the API/conduit, and the overlay entry node 60-1 then performs routing according to the notified policy for requests received from this client.

Overlay node 60-1 is the entry node for a client 65-1, and (in this example) receives an address request AR to access a memory address in a memory component 71f (which is also overlay node 60-3). At this time, according to the fabric routing protocol the designated path (e.g. the shortest path 73, labelled PATH in FIG. 4) from here to memory component 71f is by means of 71b and 71c along link 69ab, then link 69bc, then the link 69cf, but due to the state of the fabric (or the client requirements expressed as a policy implemented by 60-1), the address request forwarder of node 60-1 may determine that the address request should instead be sent to memory component MM 6 by an alternative path 75 (labelled "ALT PATH" FIG. 4) that goes via overlay node 60-2 and passes over the physical links 69ae-69ei-69hi-69gh-69fg.

So, in this example, a tagging module of 60-1 may tag the memory-addressing request AR with an indicator of 60-2, and transmit the request on link 69ae to the memory router module of memory component 71e for onward routing along link 69ei to overlay node 60-2. The addressing-request forwarder of 60-2 determines the next forwarding hop based on the destination address and the tag of the memory-addressing request AR and forwards AR to 60-3 via memory components 71h and 71g. 60-3 is an overlay exit node which removes the tag from request AR and delivers the request to a client computer program 65-3.

Figure 5:
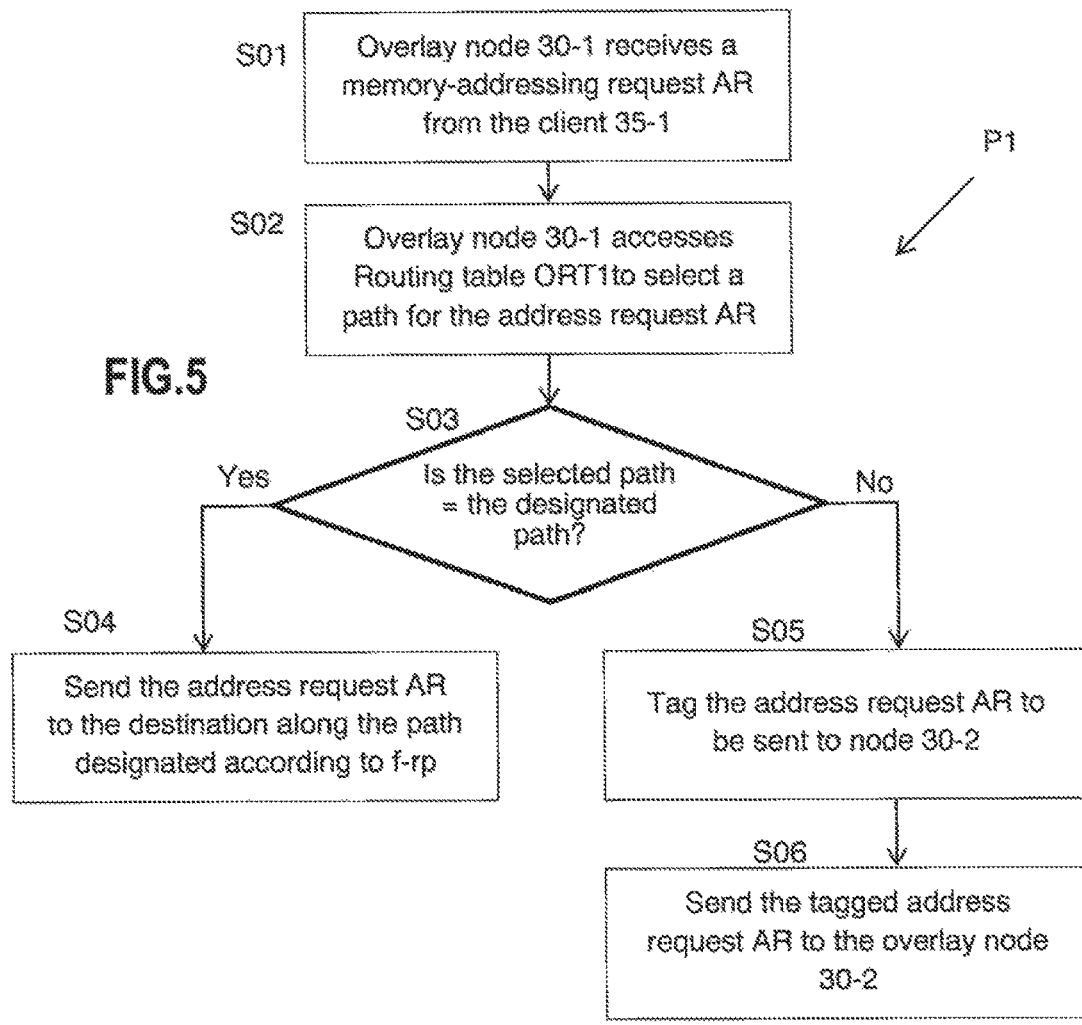
FIG. 5 is a flow chart of steps of an example method of routing an address request within the memory system.

FIG. 5 is a flow chart showing steps of a method P1 of routing an address request AR within the memory system of FIG. 2(a). In a step S01 the overlay node 30-1 receives an address request AR from the client 35-1, via its interface 34. In a step S02, the overlay node 30-1 accesses the overlay routing table ORT1 to select route to the destination that is indicated by the address request—this selection may be performed according to the client's requirements as specified in a policy notified to the overlay node 30-1. The overlay routing table ORT1 may be held in the overlay node 30-1, or elsewhere (for example in an associated element 33 forming part of the overlay 13). In a step S03, it is determined whether the selected route is the designated route in the routing table as determined by the underlying fabric routing protocol f-rp. If the response at step S03 is yes, then at a step S04 the overlay node 30-1 sends the address request to the destination along the path designated by the fabric routing protocol. If the response at step S03 is no, then at a step S05 the overlay node 30-1 tags the request such that it will be sent by an alternative path via overlay node 30-2. At a step S06, the request is sent to the overlay node 30-2.

The overlay node 30-2 determines the best route to forward the address request AR to the destination. When the request arrives at the destination overlay node, i.e. the exit overlay node in this case, the exit overlay node removes the tag(s) and delivers the request to its associated client.

Figure 6:
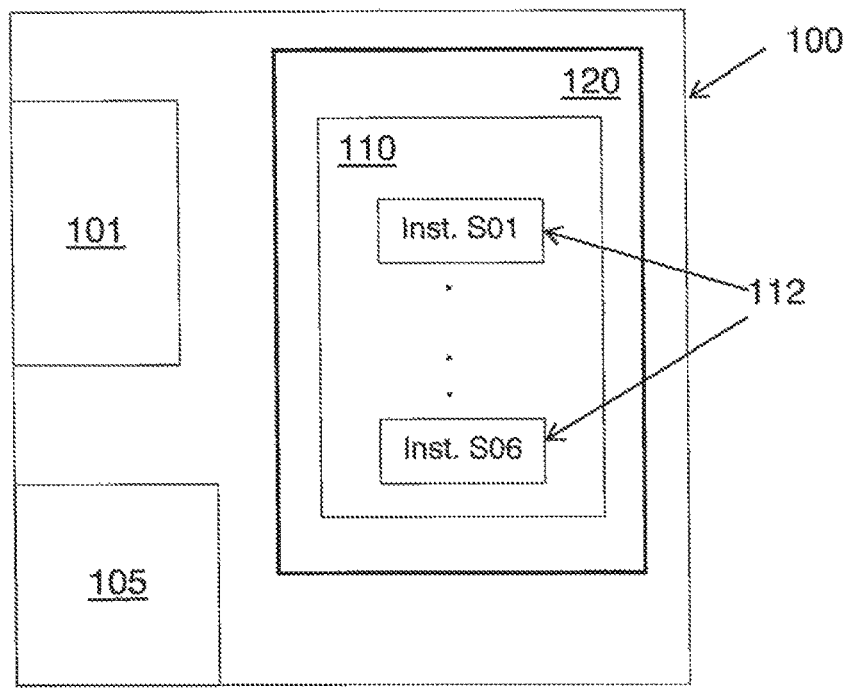
FIG. 6 schematically shows a computer comprising an example computer program to implement the FIG. 5 example method of routing an address request.

FIG. 6 schematically shows a computer 100 comprising a computer program 110 supplied on a medium 120 readable by the computer. The computer 100 further comprises a man-machine interface 101 and a processor 105 configured to execute the program 110. The program 110 comprises instructions 112 for carrying out the steps S01 to S06 of the method P1 described in relation with FIG 5. The program 112 may be stored in a non-transitory manner on the medium 120.

Overlay nodes that are going to serve as entry overlay nodes or exit overlay odes need to have a conduit for connection to a client program. However, other overlay nodes may be designed so that they never serve as entry overlay nodes or exit overlay nodes but simply help with forwarding requests along the overlay.

The number and distribution of overlay nodes over a memory fabric may be determined in various different ways. As a non-limiting example: the number and distribution of overlay nodes may be planned by a designer. As a non-limiting example, a designer may implement a zoning-based approach which define regions or zones in the memory-fabric topology and aims to provide a set of one or more overlay nodes to span each region or zone. A designer may set the number and/or distribution of overlay nodes in view of achieving a certain desired degree of resiliency, for example placing more overlay nodes in a region of the memory fabric that is judged to be liable to experience problems (outages, performance failures, etc.). In a "dynamic" memory fabric (in which memory components may join and/or leave the fabric), additional memory components may be configured as overlay nodes as the topology of the memory fabric grows larger and/or more complex.

The memory modules and components illustrated in the figures are not limited having regard to the memory technology/hardware used to implement the physical holding of data. Further, the functionality of each entity represented in the figures may be implemented using a combination of hardware and programming. Hardware of each entity may include a processor and an associated machine-readable storage medium holding instructions/code executable, by the processor to perform the designated function. Furthermore, different numbers of components or entities than depicted in the figures may be used to implement the described functions.

Although certain examples of memory systems have been described, it is to be understood that changes and additions may be made to the described examples within the scope of the appended claims.

In particular, reference to "an" or "a" module, component, etc. should not be taken as referring to only one item.

The invention claimed is:

1. A memory system, comprising:
a memory fabric, and
an overlay, wherein:
the memory fabric comprises: a network of memory components interconnected by optical interconnects, memory address spaces of the memory components being aggregated and exposed as if the network were a single memory resource, and router modules to implement steps of a fabric routing protocol to route memory-addressing requests along paths to destination memory components in said memory fabric; and
the overlay comprises overlay nodes to receive and forward memory-addressing requests from client programs and to implement steps of an overlay routing protocol to selectively control routing of received memory-addressing requests, to destination memory components, either along paths determined according to the fabric routing protocol or along alternative paths via overlay nodes.

2. A memory system according to claim 1 wherein the overlay nodes comprise addressing-request forwarders to control the path on which received memos-addressing requests are transmitted towards the destination memory components.

3. A memory system according to claim 2 wherein:
the overlay comprises overlay modules associated with N of the memory components of the memory fabric to cause the N memory components to function as overlay nodes, where N is any integer equal, to or greater than 2,
the overlay nodes include overlay entry nodes, the overlay entry nodes have interfaces to receive memory-addressing requests from respective client programs; and
the addressing-request forwarders of overlay entry nodes implement steps of the overlay routing protocol to selectively control routing of memory-addressing requests received by the client-interfaces, to the destination memory components.

4. A memory system according to claim 3, wherein the addressing-request forwarders of the overlay entry nodes judge, for each respective memory-addressing request received by the overlay entry nodes client-interlace, whether an alternative path via an overlay node is better or worse, according to a judgment criterion specified by a routing policy, than a path determined according to the fabric routing protocol.

5. A memory system according to claim 4, wherein the addressing-request forwarders of the overlay entry nodes apply the same, application-specific, routing policy to control routing of memory-addressing requests received from client programs running the same software application, or the same type of software application.

6. A memory system according to claim 4, wherein the addressing-request forwarders of the overlay entry nodes control routing of memory-addressing requests received by overlay node client-interfaces, by applying routing policies that determine the desirability of paths between overlay nodes based on path metrics specified in said policies.

7. A memory system according to claim 6, wherein the overlays comprises overlay routers to monitor path metrics of paths between overlay nodes and to maintain routing tables indicative of the monitored metrics, and the addressing-request forwarders of the overlay entry nodes access path metric data of the routing tables to judge, for each respective memory-addressing request received by the overlay entry node's client-interface, whether an alternative path via an overlay node is better or worse than a path determined according to the fabric routing protocol.

8. A memory system according to claim 7, wherein the overlay routers monitor path metrics by a combination of active probing and passive observation.

9. A memory system, according to claim 7, wherein the overlay entry nodes comprise classifier modules to assign types to memory addressing requests received at their respective client-interfaces, and the addressing-request forwarders of overlay entry nodes control routing of memory-addressing requests by applying routing policies that specify different routing criteria for memory addressing requests according to the types assigned to the respective memory-addressing requests by the classifier modules.

10. A memory system according to claim 9, wherein the overlay entry nodes comprise tagging modules to add, to memory-addressing requests that are to be routed along said alternative paths, type tags indicative of types assigned to the memory addressing requests by the classifier modules, and overlay nodes comprise tag-recognition modules to recognize type tags and control onward routing of type-tagged memory-addressing requests to use, preferentially, the same path for memory-addressing requests having the same type tag unless a quality criterion determined for said same path degrades beyond a specified threshold.

11. A memory system according to claim 7, wherein the overlay entry nodes comprise tagging modules to add, to memory addressing requests that are to be routed along said alternative paths, identification tags indicative of respective destination overlay nodes on said alternative paths, and router modules of the memory fabric are responsive to said identification tags to route tagged memory-addressing requests towards the respective destination overlay nodes.

12. A memory system according to claim 11, wherein
the overlay nodes include overlay exit nodes, and
the overlay exit nodes have interfaces to deliver memory-addressing requests to respective client programs, and are responsive to receipt of memory-addressing requests tagged by identification tags, in the event that the respective identification tag designates this overlay exit node as a destination, to:
remove the identification tag from the received memory-addressing request, and deliver the memory-addressing request to this overlay exit node's associated client program via the client-interface.

13. A memory component device to connect to a memory system according to claim 1, the memory component device comprising:
an interface to receive, from client programs, memory-addressing requests to access respective destination memory components of the memory fabric; and
an addressing-request forwarder to implement steps an overlay routing protocol to selectively control routing of memory-addressing requests received by the client-interface, to the destination memory components, either along paths determined according to the fabric routing protocol or along alternative paths via overlay nodes.

14. A method of routing memory-addressing requests within a memory system that comprises a memory fabric and an overlay, the memory fabric comprising: a network of memory components interconnected by optical interconnects, memory address spaces of the memory components being aggregated and exposed as if the network were a single memory resource, and router modules to implement steps of a fabric routing protocol to route memory-addressing requests along paths to destination memory components in said memory fabric, and the overlay comprising overlay nodes to receive and forward memory-addressing requests from client programs and to implement steps of an overlay routing protocol to selectively control routing of received memory-addressing requests, to destination memory components, either along paths determined according to the fabric routing protocol or along alternative paths via overlay nodes, the routing method comprising the steps of:

receiving, by a client-interface of an overlay entry node, a memory-addressing request to access a destination memory component of the memory fabric; and selectively controlling routing of the received memory-addressing request either along a path determined according to the fabric routing protocol or along an alternative path via a set of one or more overlay nodes.

15. A computer-readable storage medium encoded with instructions executable by at least one processor in a memory system that comprises a memory fabric and an overlay, the memory fabric comprising: a network of memory components interconnected by optical interconnects, memory address spaces of the memory components being aggregated and exposed as if the network were a single memory resource, and router modules to implement steps of a fabric routing protocol to route memory-addressing requests along paths to destination memory components in said memory fabric, and the overlay comprising overlay nodes to receive and forward memory-addressing requests from client programs and to implement steps of an overlay routing protocol to selectively control routing of received memory-addressing requests, to destination memory components, either along paths determined according to the fabric routing protocol or along alternative paths via overlay nodes, the machine-readable storage medium comprising:

instructions to receive by a client-interface of an overlay entry node, a memory-addressing request to access a destination memory component of the memory fabric; and instructions to selectively control routing of the received memory-addressing request either along a path determined according to the fabric routing protocol or along an alternative path via a set of one or more overlay nodes.

* * * * *